United States Patent
Pruthi et al.

(10) Patent No.: US 9,264,824 B2
(45) Date of Patent: Feb. 16, 2016

(54) INTEGRATION OF HEARING AIDS WITH SMART GLASSES TO IMPROVE INTELLIGIBILITY IN NOISE

(71) Applicant: Starkey Laboratories, Inc., Eden Prairie, MN (US)

(72) Inventors: Tarun Pruthi, Eden Prairie, MN (US); Xavier Chabot, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 143 days.

(21) Appl. No.: 13/956,092

(22) Filed: Jul. 31, 2013

(65) Prior Publication Data

US 2015/0036856 A1    Feb. 5, 2015

(51) Int. Cl.
*H04R 25/00* (2006.01)
*G06F 3/0484* (2013.01)
*G10L 15/26* (2006.01)
*G06F 3/01* (2006.01)
(Continued)

(52) U.S. Cl.
CPC ............ *H04R 25/505* (2013.01); *G02B 27/017* (2013.01); *G06F 3/011* (2013.01); *G06F 3/04842* (2013.01); *G10L 15/26* (2013.01); *H04R 25/00* (2013.01); *G02B 2027/014* (2013.01); *G10L 15/25* (2013.01); *H04R 25/453* (2013.01); *H04R 2460/01* (2013.01)

(58) Field of Classification Search
CPC .. H04R 25/50; H04R 25/505; H04R 2460/01; H04R 2225/43; H04R 2499/11; G02B 27/017
See application file for complete search history.

(56) References Cited

U.S. PATENT DOCUMENTS

| | | |
|---|---|---|
| 3,125,646 A | 3/1964 | Lewis |
| 4,451,709 A | 5/1984 | Waxman |

(Continued)

FOREIGN PATENT DOCUMENTS

| | | |
|---|---|---|
| WO | WO-2006055884 A2 | 5/2006 |
| WO | WO-2014190086 A2 | 11/2014 |

(Continued)

OTHER PUBLICATIONS

"International Application Serial No. PCT/US2014/039026, Invitation to Pay Additional Fees and Partial Search Report mailed Sep. 11, 2014", 4 pgs.

(Continued)

*Primary Examiner* — Matthew Eason
(74) *Attorney, Agent, or Firm* — Schwegman Lundberg & Woessner, P.A.

(57) ABSTRACT

Disclosed herein, among other things, are methods and apparatuses for integration of hearing aids with an MSD to improve intelligibility in noisy environments. One aspect of the present subject matter relates to a method of providing voice audio to a hearing aid or text in a hearing aid user's field of view, where the voice audio or text corresponds to a speaker of interest within a noisy environment, and where the speaker of interest is identified using smart glasses. An MSD graphical user interface is provided for a hearing aid user to identify a speaker of interest. The lip movement patterns of the speaker of interest are recorded by the smart glasses, and voice activity detection is performed on the lip movement patterns. Noise reduction is performed using the results of the voice activity detection. The noise-reduced voice audio may be transmitted to the hearing aid, or the speech recognition text may be transmitted to and displayed on the MSD.

28 Claims, 5 Drawing Sheets

(51) Int. Cl.
*G02B 27/01* (2006.01)
*G10L 15/25* (2013.01)

(56) References Cited

U.S. PATENT DOCUMENTS

| | | | |
|---|---|---|---|
| 4,731,850 | A | 3/1988 | Levitt et al. |
| 6,137,889 | A | 10/2000 | Shennib et al. |
| 6,204,974 | B1 | 3/2001 | Spitzer |
| 7,278,734 | B2 | 10/2007 | Jannard et al. |
| 7,609,842 | B2 | 10/2009 | Sipkema et al. |
| 8,351,626 | B2 | 1/2013 | Hersbach et al. |
| 8,477,952 | B2 | 7/2013 | Elmedyb et al. |
| 8,493,204 | B2 | 7/2013 | Wong et al. |
| 8,705,177 | B1 | 4/2014 | Miao |
| 8,781,143 | B2 | 7/2014 | Pedersen et al. |
| 8,854,447 | B2 * | 10/2014 | Conness ............ H04N 5/60 345/156 |
| 8,893,164 | B1 | 11/2014 | Teller |
| 2003/0099370 | A1 * | 5/2003 | Moore ............ 381/312 |
| 2004/0117191 | A1 | 6/2004 | Seshadri |
| 2006/0224382 | A1 | 10/2006 | Taneda |
| 2009/0010442 | A1 | 1/2009 | Usher |
| 2010/0309426 | A1 | 12/2010 | Howell et al. |
| 2011/0257971 | A1 | 10/2011 | Morrison |
| 2012/0163625 | A1 * | 6/2012 | Siotis ............ H04R 3/005 381/92 |
| 2012/0212399 | A1 | 8/2012 | Border et al. |
| 2012/0282976 | A1 | 11/2012 | Suhami |
| 2013/0044042 | A1 * | 2/2013 | Olsson et al. ............ 345/8 |
| 2013/0215374 | A1 | 8/2013 | Blum et al. |
| 2014/0129207 | A1 * | 5/2014 | Bailey et al. ............ 704/2 |
| 2014/0185845 | A1 | 7/2014 | Udesen |
| 2014/0236594 | A1 | 8/2014 | Clarke et al. |
| 2014/0348363 | A1 | 11/2014 | Edwards |
| 2014/0348364 | A1 | 11/2014 | Edwards |
| 2014/0348365 | A1 | 11/2014 | Edwards |

FOREIGN PATENT DOCUMENTS

| | | |
|---|---|---|
| WO | WO-2014190086 A3 | 11/2014 |
| WO | WO-2015017007 A1 | 2/2015 |

OTHER PUBLICATIONS

"International Application Serial No. PCT/US2014/039220, International Search Report mailed Aug. 13, 2014", 3 pgs.

"International Application Serial No. PCT/US2014/039220, Written Opinion mailed Aug. 13, 2014", 4 pgs.

"U.S. Appl. No. 14/285,170, Non Final Office Action mailed Jan. 16, 2015", 12 pgs.

"U.S. Appl. No. 14/285,210, Non Final Office Action mailed Jan. 30, 2015", 10 pgs.

"U.S. Appl. No. 14/285,225, Non Final Office Action mailed Jan. 30, 2015", 14 pgs.

"U.S. Appl. No. 14/285,170, Response filed May 18, 2015 to Non Final Office Action mailed Jan. 16, 2015", 9 pgs.

"U.S. Appl. No. 14/285,210, Response filed Jun. 1, 2015 to Non Final Office Action mailed Jan. 30, 2015", 7 pgs.

"U.S. Appl. No. 14/285,225, Response filed Jun. 1, 2015 to Non Final Office Action mailed Jan. 30, 2015", 8 pgs.

* cited by examiner

INTEGRATION OF HEARING AIDS WITH SMART GLASSES TO IMPROVE INTELLIGIBILITY IN NOISE

INCORPORATION BY REFERENCE

This application is related to U.S. Provisional Patent Application Ser. No. 61/826,483, filed on May 22, 2013, which is incorporated herein by reference in its entirety.

FIELD OF THE INVENTION

The present subject matter relates generally to hearing assistance devices, and in particular to the integration of hearing aids with smart glasses to improve intelligibility in noise.

BACKGROUND

Modern "smart glasses" or augmented reality multisensory display devices (MSDs), such as Google Glass, may provide visual and auditory information to the wearer of the device beyond what they normally would see or hear without the device. MSDs may refer to any device that provides a heads-up display (e.g., a display in the current field of view) of visual information from an MSD or other computing device. MSDs may also provide the capability to recognize input speech. The speech recognition capability may be built-in, or may be enabled by sending and receiving recorded audio or speech recognition results to or from a network (e.g., the internet, the "cloud") or another computing device. In various MSDs, the sensory information provided to the wearer of the device includes an augmentation of the environment around the wearer (visually or aurally displaying identification of objects around the wearer after object identification, such as a user's name when the face is identified). In various examples, the sensory information may be unrelated to the environment, such as providing an incoming text message visually or aurally. In various applications, combinations of sensory information augmenting the wearer's environment and sensory information unrelated to the environment are provided to the wearer.

Modern hearing assistance devices, such as hearing aids, typically include digital electronics to enhance the wearer's listening experience. Hearing aids are electronic instruments worn in or around the ear that compensate for hearing losses by specially amplifying sound. Hearing aids use transducer and electro-mechanical components that are connected via wires to the hearing aid circuitry.

Hearing aid users often find it difficult to understand speech in noisy conditions. Speech understanding in noisy conditions may be improved by providing the ability to replay audio from the last few seconds of speech. However, in such a case, the repeated speech might overlap with ongoing live speech. This problem with overlapping speech can be avoided by running a live speech recognizer on all speech around the hearing aid user (either all the time, or on-demand) and displaying the text on a screen such as that of a smartphone. However, this would require the user to look continuously at the phone's screen to read the recognition result.

What is needed in the art is an improved system for isolating the desired speaker's sound and displaying speech recognition output corresponding to the desired speaker's speech in noisy environments.

SUMMARY

Disclosed herein, among other things, are methods and apparatuses for integration of hearing aids with a multisensory display device (MSD) to improve intelligibility in noise.

One aspect of the present subject matter relates to a method of providing voice audio to a hearing aid, where the voice audio corresponds to a speaker of interest within a noisy environment, and where the speaker of interest is identified using an MSD. A heads-up graphical user interface is provided for a hearing aid user to identify a speaker of interest. The lip movement patterns of the speaker of interest are recorded by the MSD, and voice activity is detected by analyzing the recorded lip movement patterns. Audio data are recorded in the noisy environment using one or more microphones in the hearing aid or MSD. Noise reduction is performed on the audio data using the results of the voice activity detection, improving the ability of the noise reduction to distinguish the voice audio of the speaker from other sounds within the noisy environment. The noise-reduced voice audio then may be transmitted to the hearing aid. If the speaker of interest is also wearing an MSD, audio may be recorded at the speaker's MSD and transferred via a wireless protocol to the user's MSD.

One aspect of the present subject matter relates to a method of providing a display of text in an user's field of view, where the text is generated by speech recognition for a speaker of interest within a noisy environment, and where the speaker of interest is identified using MSDs. A heads-up graphical user interface is provided for a user to identify a speaker of interest. The lip movement patterns of the speaker of interest are recorded by the MSD, and voice activity is detected by analyzing the recorded lip movement patterns. Audio data are recorded in the noisy environment using one or more microphones in a hearing aid or MSD. Noise reduction is performed on the audio data using the results of the voice activity detection, improving the ability of the noise reduction to distinguish the voice audio of the speaker from other sounds within the noisy environment. Speech recognition may be performed directly on the recorded audio, or preferably on the noise-reduced voice audio, and the speech recognition text may be transmitted to and displayed on the MSD. This speech recognition and display of text may be performed on-demand, or may be performed continuously while the user is wearing an MSD. Other aspects are provided without departing from the scope of the present subject matter.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings that show, by way of illustration, specific aspects and embodiments in which the present subject matter may be practiced. These embodiments are described in sufficient detail to enable those skilled in the art to practice the present subject matter. References to "an," "one," or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter relates, among other things, to methods and apparatuses for integration of hearing aids with an MSD to improve intelligibility in noisy environments. In various embodiments, the present subject matter may include providing voice audio to a hearing aid user, providing speech recognition text to an MSD user, or providing both voice audio and speech recognition text. The voice audio or text may correspond to a speaker of interest within a noisy environment, and the speaker of interest may be identified using MSDs.

Figure 1A:
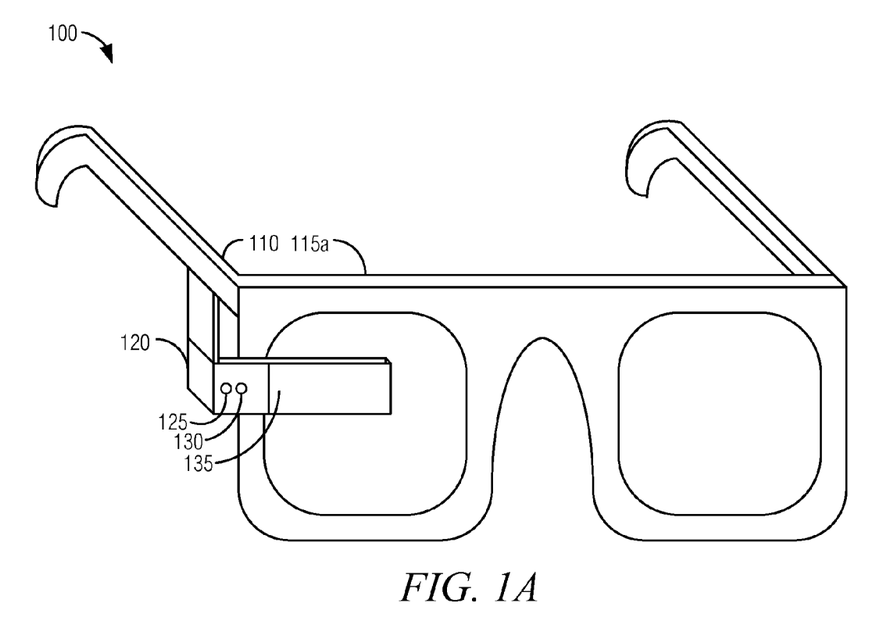
FIGS. 1 and 1B are example variations of MSD form factors according to one embodiment of the present subject matter.
Figure 1B:
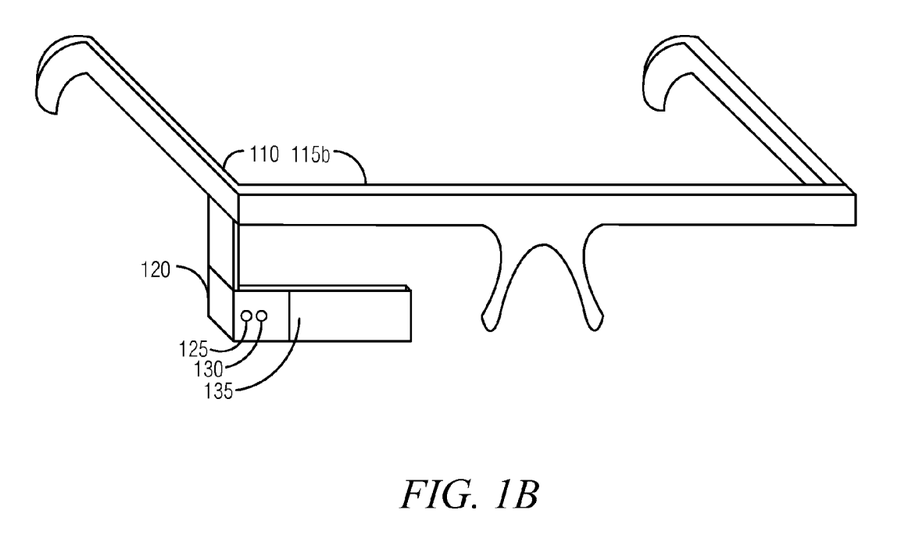

FIGS. 1A and 1B are example variations of MSD form factors 100 according to one embodiment of the present subject matter. The MSD may include wearable glasses that include side-arms 110. The example MSD in FIG. 1A includes frames with lenses 115a, whereas the example MSD in FIG. 1B includes a frame without lenses 115b. The MSD may include an on-board computing system 120. The MSD may include a microphone 125, which may be an omnidirectional microphone or one or more directional microphones. The MSD may include an image capture device, which may be a still image capture device or a video capture device. The MSD may include a display screen 135 in the wearer's field of view. The display screen 135 may be transparent, and when used, text or images may be displayed.

Figure 2:
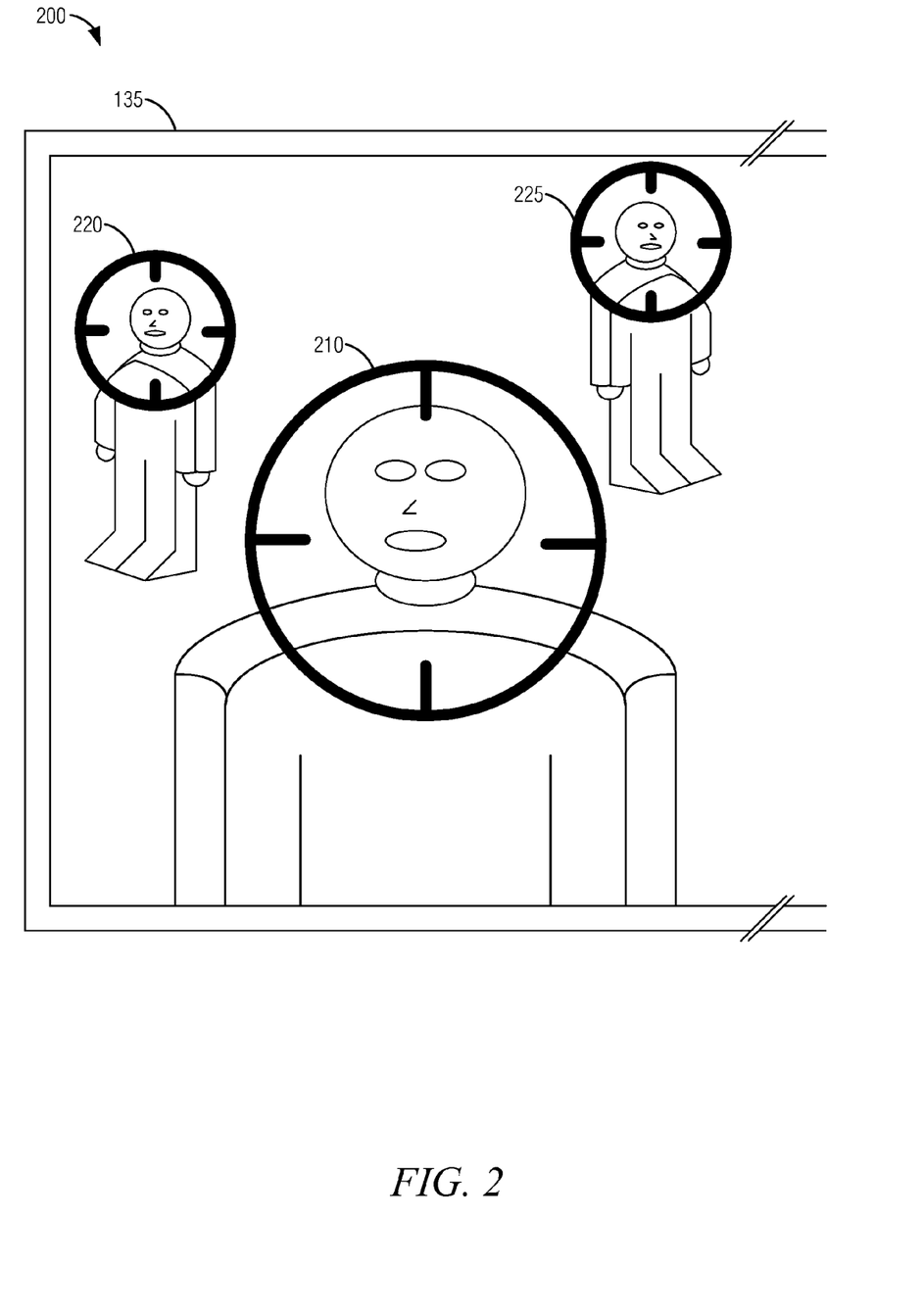
FIG. 2 is an example GUI selection of a speaker of interest according to one embodiment of the present subject matter.

FIG. 2 is an example GUI selection 200 of a speaker of interest according to one embodiment of the present subject matter. In various embodiments, an MSD graphical user interface is provided for a user to identify a speaker of interest. The example selection 200 may occur within a portion of the display screen 135 of the MSD. The user initiates the graphical user interface to identify the speaker of interest, and the MSD generates an identification icon. The user may initiate the GUI selection of the speaker of interest by pressing a button on the MSD, by voice command, or by other input. Once the user initiates selection, an identification icon 210 may be placed in the display screen 135, where the identification icon 210 corresponds approximately to the center of the user's field of view. The identification icon may be in the form of a reticle, crosshairs, circle, or box, or other form. After initiation of the GUI selection, the MSD may capture and process an image viewable by the MSD. The graphical user interface may perform preliminary voice activity detection on the captured image to identify potential speakers of interest. The user may aim the identification icon 210 toward one or more speakers of interest. Aiming the identification icon 210 may be performed by the user moving his or her head, may be performed by providing speech commands or other input to move the reticle on the screen, or may be performed by other means. During aiming, the identification icon 210 may remain in a fixed position within the display screen 135, or the reticle may move (e.g., snap) the identification icon 210 to superimpose the identification icon 210 on a specific speaker of interest identified through facial detection. The example selection 200 may also identify one or more persons within the display screen 135, where additional persons may be designated using additional reticles. When multiple persons are identified, the user may indicate the speaker of interest by aiming the MSD so the central reticle is superimposed on the desired speaker of interest, and providing an input. Also when multiple persons are identified, the user may provide an input to cycle through identified persons and select the speaker of interest, where cycling may including highlighting of each reticle by a change in the reticle size, shape, line weight, or other reticle characteristic.

Figure 3A:
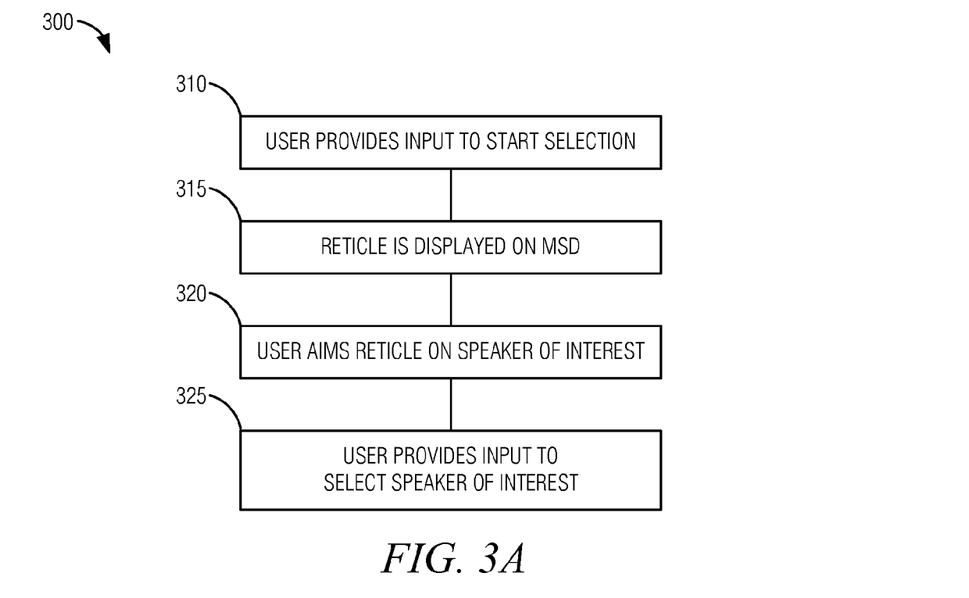
FIGS. 3A and 3B are example flowcharts of the selection of a speaker of interest according to one embodiment of the present subject matter.
Figure 3B:
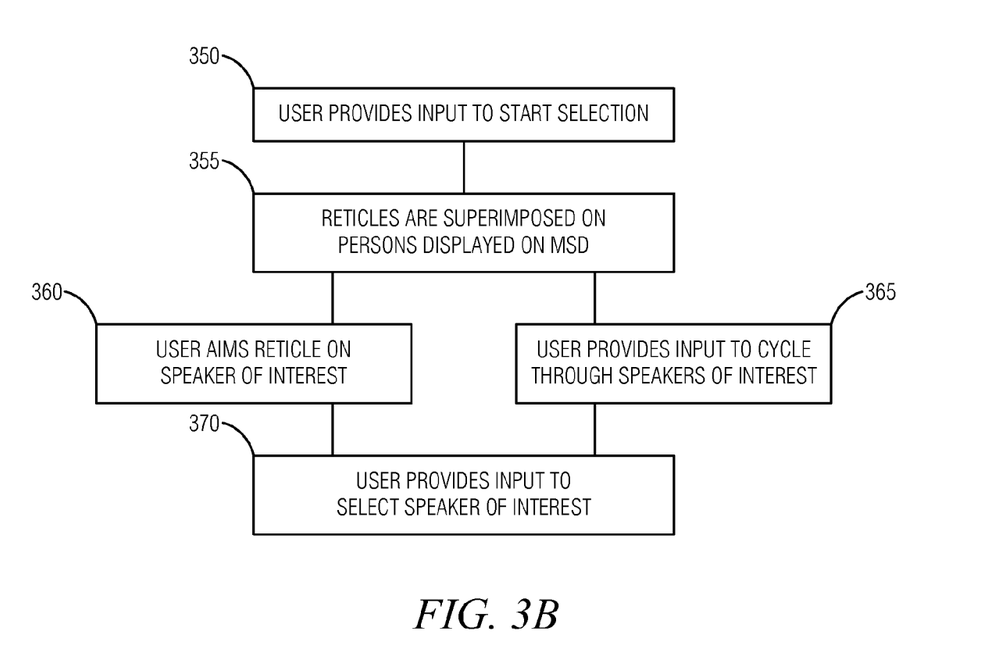

FIGS. 3A and 3B are example flowcharts 300 of the selection of a speaker of interest according to one embodiment of the present subject matter. FIG. 3A is an example flowchart of the selection of a speaker of interest using a single-reticle embodiment, whereas FIG. 3B is an example flowchart of the selection of a speaker of interest using a multiple-reticle embodiment. In various single-reticle selection embodiments, the user may initiate 310 the selection of the speaker of interest by pressing a button on the MSD, by voice command, or by other input. Once the user initiates selection, a central reticle is displayed 315 in the display screen, where the reticle corresponds approximately to the center of the user's field of view. The user may aim 320 the MSD toward the speaker of interest, and then provide an input 325 to indicate the speaker of interest is currently within the reticle. In various multiple-reticle selection embodiments, the user may initiate 350 the selection of the speaker of interest. Additional persons may be designated on the MSD by superimposing 355 reticles on each potential speaker of interest. To select between or among multiple reticles, the user may aim 360 a central reticle on the speaker of interest, or the user may provide an input 365 to cycle through a highlighting of the available reticles. The user may provide an input 370 to indicate the speaker of interest is within the central reticle, or to indicate the speaker of interest corresponds to the currently highlighted reticle.

Figure 4:
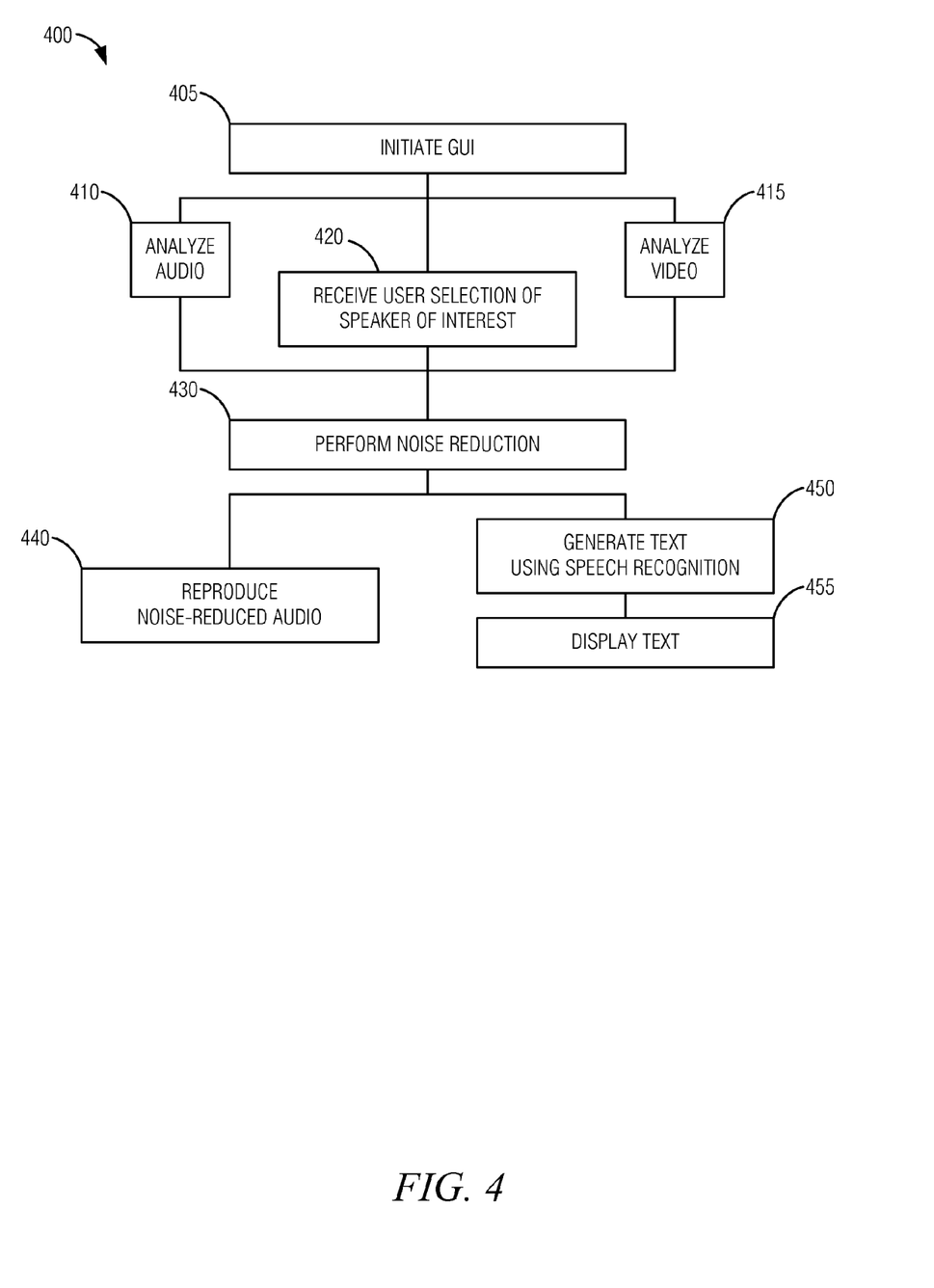
FIG. 4 is a flow chart of voice activity detection noise suppression according to one embodiment of the present subject matter.

FIG. 4 is a flow chart 400 of voice activity detection noise suppression according to one embodiment of the present subject matter. Upon initiating the GUI 405, the MSD may begin analyzing audio 410, analyzing video 415, or prompting for and receiving 420 a user selection of a speaker of interest. Audio analysis 410, video analysis 415, and receiving 420 a user selection may occur simultaneously, sequentially, or in any other order. Audio analysis 410, video analysis 415, and receiving 420 a user selection capability may be built into the MSD, or may be enabled by sending and receiving audio or video to or from a network or another computing device.

The audio analysis 410 may include characterizing whether one or more speakers may be identified, characterizing the noise level of an environment, identifying speakers based on voice patterns, or other audio analysis. In various embodiments, a microphone is configured in a hearing aid or MSD such that sound from the environment is received, processed in some way, and played to the hearing aid or MSD wearer. Audio data are recorded in the noisy environment, either using one or more microphones in the hearing aid or MSD. Audio data may be recorded for the entire environment using an omnidirectional microphone. Audio data may be recorded using a directional microphone, where the directional microphone may be continuously focused in a direction coinciding with a reticle. The directional microphone may be in a fixed orientation when using a fixed reticle. The directional microphone may be adaptively focused when using a moveable reticle, where the focus of the microphone array may be steered in a direction (e.g., beamforming) corresponding to the direction of the moveable reticle. Using an omnidirectional microphone or multiple directional microphones, one or more reticles could snap to one or more speakers of interest, and may prompt the MSD user to change the speaker of interest. When changing the speaker of interest, the MSD may snap one or more reticles to speakers of interest, but should minimize the number of unexpected changes, for example, by focusing on a single speaker of interest until the user provides an input to change the speaker of interest.

The video analysis 415 may include identifying one or more potential speakers of interest through facial detection, performing facial recognition, performing preliminary voice activity detection through analysis of lip movements, or other video analysis. Lip movements may indicate when the speaker of interest is speaking, and a lack of lip movement may indicate when the speaker of interest is silent. The lip movement may be analyzed by a voice activity detection module to identify the time during which one or more speakers of interest are speaking. The speaking time may be used to isolate sounds within a noisy environment that correspond to the speaker of interest. Video analysis 415 may apply a basic speech recognition algorithm on lip movements to provide alignment of basic sounds (e.g., phonemes). By using time alignment of basic sounds, the algorithm may isolate audio data from the speaker of interest from other non-speech audio data.

Noise reduction 430 may be performed on the audio data using the results of the voice activity detection, improving the ability of the noise reduction 430 to distinguish the voice audio of the speaker from other sounds within the noisy environment. Voice activity detection data may be used to identify the time during which the speaker of interest is speaking Using the time during which the speaker of interest is speaking, the noise reduction 430 may identify voice or speech characteristics corresponding to the speaker of interest. Various voice or speech characteristics of the voice of the speaker of interest may be stored, enabling the MSD to generate a noise reduction profile corresponding to the speaker of interest.

These audio characteristics may include a frequency range, a voice pattern, or other characteristics. Using identified audio characteristics, the noise reduction 430 may diminish voices or other sounds that do not correspond to the speaker of interest. In various embodiments, MSDs are configured to monitor noise level in the environment and apply gain and/or compression to the audio from the augmented MSD to place spectral level of the MSD audio above the spectral level of the environmental noise, maintaining intelligibility and sound quality with changing environmental sounds. There may be feedback issues that require a feedback canceller, where the feedback canceller is not normally included in such systems. Feedback issues may have various causes, such as if the MSD or hearing aid wearer has hearing loss and the audio augmentation includes amplification to correct for the hearing loss.

In various embodiments, the noise-reduced voice audio then may be transmitted to and reproduced 440 by the MSD or hearing aid. The noise-reduced voice audio may be stored in the MSD or hearing aid for archival or on-demand audio replay purposes. For on-demand audio replay, the user may provide an input that plays a specific replay duration of the noise-reduced voice audio. The replay duration may be configured by the graphical user interface, or may be preset to replay the previous five seconds of noise-reduced voice audio.

In various embodiments, text may be generated 450 using speech recognition performed on the noise-reduced voice audio. The speech recognition text may be transmitted to and displayed 455 on the MSD. The speech recognition text may be displayed instantly on the MSD for the user, or the speech recognition text may be stored in the MSD for archival or on-demand text replay purposes. For on-demand text replay, the user may provide an input that plays a specific amount of the speech recognition text. The amount of speech recognition text may be configured by the graphical user interface, or may be preset to replay the previous sentence of speech recognition text.

Figure 5:
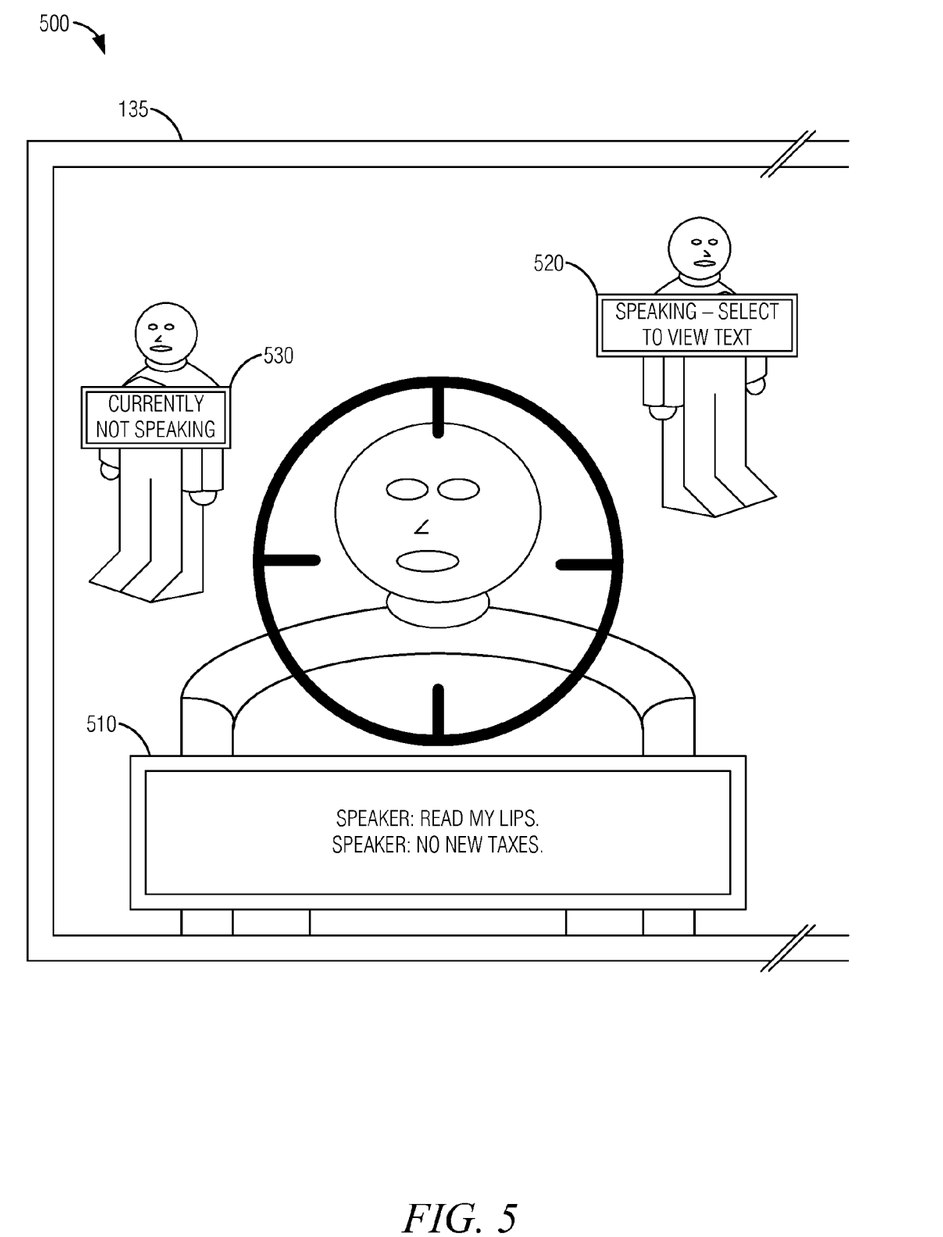
FIG. 5 is an example textual display according to one embodiment of the present subject matter.

FIG. 5 is an example textual display 500 according to one embodiment of the present subject matter. In one embodiment, the display screen 135 of the MSD may display speech recognition text 510 corresponding to the speaker of interest. If the MSD has stored one or more noise reduction profiles, the textual display 500 may indicate an alternate speaker of interest is currently speaking 520, and may prompt the MSD user to select the alternate speaker of interest. The textual display 500 may indicate an alternate speaker of interest is not currently speaking 530. In some embodiments, a noise reduction profile may be associated with contact information within a user's list of contacts, and the textual display 500 may indicate the name of the speaker. In some embodiments, the MSD may apply facial recognition software to the speaker of interest, and may suggest associating the speaker of interest with one or more contacts within the user's list of contacts.

In various embodiments, receiver-in-canal hearing aid device (RIC HA) cable assemblies may be attached to an augmented reality MSD to provide audio delivery with a speaker in the canal, where the in-canal speaker is an alternative to bone-conduction delivery or traditional earphone inserts. Wireless in-the-canal devices similar to wireless completely-in-the-canal (CIC) hearing aids or a wireless personal amplification device, such as the AMP device, may be configured to pick up sound transmitted from the MSD for the sound delivery system to the MSD wearer. In various embodiments, the wireless transmission could be high frequency such as 900 MHz or 2.4 GHz. In various embodiments, the wireless transmission may be near field magnetic induction, or may be electromagnetic signals such that a traditional telecoil or GMR transducer found in hearing aids can receive the transmitted audio from the MSD. In various embodiments, combinations of these systems may be employed and may be combined with other communication systems.

Some MSDs have bone conduction speakers/transducers to provide audio to the wearer of the MSD. There are many drawbacks to this, including poor sound quality due to the bandpass nature of sound conducted through the skull, and poor spatial perception due to distortion of binaural cues necessary for spatial hearing. In various embodiments, the MSD design is improved by combining the bone-conducted sound with delivery of air-conducted sound, such as the provided by a receiver in the wearer's canal that gets the audio signal from the MSD in a wired or wireless fashion. The air-conducted sound would enhance the sound quality and/or spatial character of the presented sound while maintaining the benefits of bone-conduction sound presentation, such as privacy of what is being heard. Since the air-conducted sound does not have to provide the full auditory experience, the levels and bandwidth of the air-conducted sound can be less than what they would have to be if there were no additional bone-conduction sounds being provided.

In various embodiments, BTE-style cases and hearing aid-type of electronics may be physically attached to the MSD so that the audio signal is electronically passed to the BTE device and the BTE device is responsible for providing delivery of sound to the wearer.

In various embodiments, hearing aid circuitry is embedded in the MSD to provide audio that compensates for the hearing loss of the wearer, using such signal processing systems as linear gain, frequency shaping, multiband compression, frequency translation, frequency compression, and combinations of these.

A deep-fitting device that sits near the ear drum and can stay in a person's ear canal for weeks without removal and can be used as the sound delivery system for the MSD, where the MSD transmits a digital or analog audio signal to the deep-fitting device wirelessly.

It is understood that variations in communications circuits, protocols, antenna configurations, and combinations of components may be employed without departing from the scope of the present subject matter. Hearing assistance devices typically include an enclosure or housing, a microphone, hearing assistance device electronics including processing electronics, and a speaker or receiver. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

It is further understood that a variety of hearing assistance devices may be used without departing from the scope and the devices described herein are intended to demonstrate the subject matter, but not in a limited, exhaustive, or exclusive sense. It is also understood that the present subject matter can be used with devices designed for use in the right ear or the left ear or both ears of the wearer.

It is understood that hearing aids typically include a processor. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples may omit certain modules that perform frequency synthesis, frequency analysis, analog-to-digital conversion, digital-to-analog conversion, amplification, and certain types of filtering and processing. In various embodiments, the processor is adapted to perform instructions stored in memory that may or may not be explicitly shown. Various types of memory may be used, including volatile and nonvolatile forms of memory. In various embodiments, instructions are performed by the processor to perform a number of signal processing tasks. In such embodiments, analog components may be in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

The present subject matter is demonstrated for hearing assistance devices, including hearing aids, including but not limited to, behind-the-ear (BTE), receiver-in-canal (RIC), and completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used with in-the-ear (ITE) and in-the-canal (ITC) devices. The present subject matter can also be used in hearing assistance devices generally, such as cochlear implant type hearing devices and such as deep insertion devices having a transducer, such as a receiver or microphone, whether custom fitted, standard, open fitted, or occlusive fitted. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method comprising:
    providing a graphical user interface in a user field of vision for a user to identify and select a speaker of interest from a plurality of speakers;
    recording a plurality of lip movement patterns of the speaker of interest;
    generating voice activity detection data from the plurality of lip movement patterns;
    recording voice audio data; and
    generating noise-reduced voice audio data, wherein generating the noise-reduced voice audio data uses the voice activity detection data to isolate voice audio within the recorded voice audio data corresponding to the speaker of interest.

2. The method of claim 1, wherein recording a plurality of lip movement patterns of the speaker of interest includes steering a focus of a microphone array to a location corresponding to the speaker of interest.

3. The method of claim 1, further comprising:
    transmitting the noise-reduced voice audio data to a hearing aid worn by the user.

4. The method of claim 3, wherein the noise-reduced voice audio data is transmitted continually to the hearing aid.

5. The method of claim 3, wherein transmitting the noise-reduced voice audio data to the hearing aid is initiated by the user.

6. The method of claim 5, wherein the noise-reduced voice audio data is stored in an audio data buffer, and wherein a predetermined duration of stored noise-reduced voice audio data is transmitted to the hearing aid worn by the user.

7. The method of claim 1, further comprising:
    generating speech recognition text using the noise-reduced voice audio;
    displaying the speech recognition text on the graphical user interface.

8. The method of claim 7, wherein the speech recognition text is displayed continually on the graphical user interface.

9. The method of claim 7, wherein displaying the speech recognition text on the graphical user interface is initiated by the user.

10. The method of claim 9, wherein the speech recognition text is stored in a text buffer, and wherein a predetermined amount of stored speech recognition text is displayed on the graphical user interface.

11. The method of claim 1, wherein providing a graphical user interface includes providing a user-worn personal computer.

12. The method of claim 1, wherein providing a graphical user interface includes providing a user-worn input device.

13. The method of claim 1, wherein providing a graphical user interface includes providing a gesture sensing input.

14. The method of claim 1, wherein providing a graphical user interface includes providing a speech recognition input.

15. The method of claim 1, wherein providing a graphical user interface includes providing for patient input to adjust the settings in real-time.

16. A system comprising:
a smart glasses graphical user interface configured to receive a user input to identify and select a speaker of interest from a plurality of speakers;
a video recording module configured to record a plurality of lip movement patterns of the speaker of interest;
a voice activity detection module configured to receive the plurality of lip movement patterns and generate voice activity detection data from the plurality of lip movement patterns;
a voice audio data recording module; and
a noise-reduced voice audio data generation module configured to receive the voice activity detection data and voice audio data, and configured to generate noise-reduced voice audio data corresponding to the speaker of interest.

17. The system of claim 16, further comprising:
a directional microphone array configured to focus audio detection in a direction corresponding to the speaker of interest.

18. The system of claim 16, further comprising:
a hearing assistance device configured to receive noise-reduced voice audio data and reproduce audible noise-reduced voice audio corresponding to the speaker of interest.

19. The system of claim 18, further comprising:
an audio data buffer configured to store a predetermined duration of voice audio data, wherein the smart glasses graphical user interface is further configured to receive a user input to cause the hearing assistance device to reproduce the predetermined duration of audible noise-reduced voice audio.

20. The system of claim 16, further comprising:
a speech recognition text generation module configured to receive the noise-reduced voice audio data and generate speech recognition text; and
a smart glasses graphical user display configured to receive and display speech recognition text corresponding to the speaker of interest.

21. The system of claim 17, further comprising:
a speech recognition text buffer configured to store a predetermined amount of speech recognition text, wherein the smart glasses graphical user interface is further configured to receive a user input to cause the smart glasses graphical user display configured to receive and display the predetermined amount of speech recognition text.

22. The system of claim 18, wherein the hearing assistance device includes a hearing aid.

23. The system of claim 18, wherein the hearing aid includes an in-the-ear (ITE) hearing aid.

24. The system of claim 18, wherein the hearing aid includes a behind-the-ear (BTE) hearing aid.

25. The system of claim 18, wherein the hearing aid includes an in-the-canal (ITC) hearing aid.

26. The system of claim 18, wherein the hearing aid includes a receiver-in-canal (RIC) hearing aid.

27. The system of claim 18, wherein the hearing aid includes a completely-in-the-canal (CIC) hearing aid.

28. The system of claim 18, wherein the hearing aid includes a receiver-in-the-ear (RITE) hearing aid.

* * * * *